Oct. 15, 1968     P. J. BENIER     3,405,663
ROUNDING MACHINE
Filed Aug. 22, 1966     2 Sheets-Sheet 1
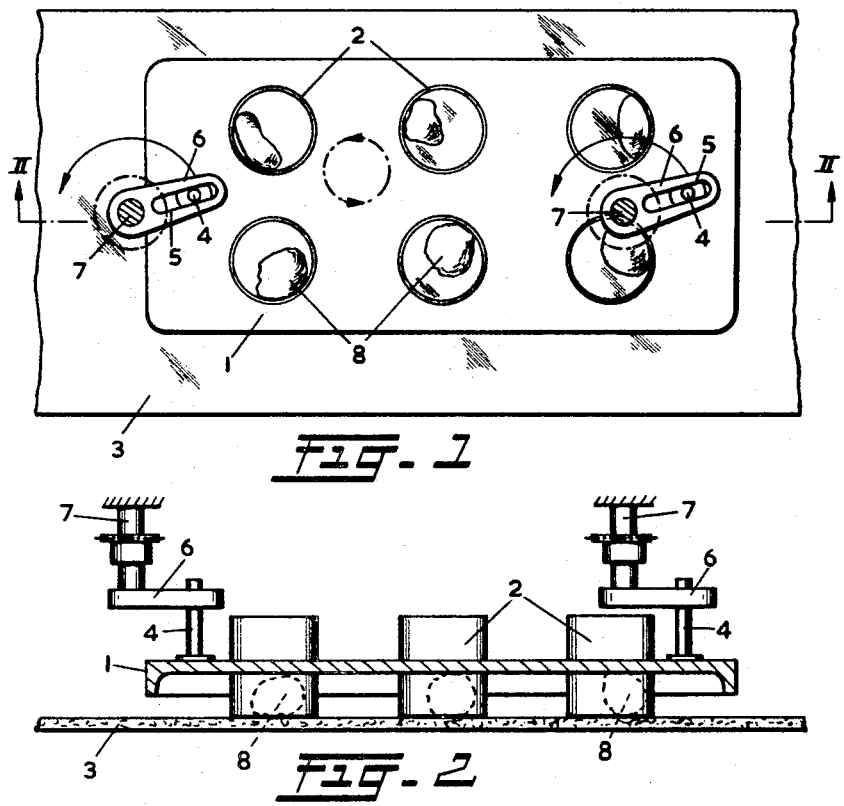

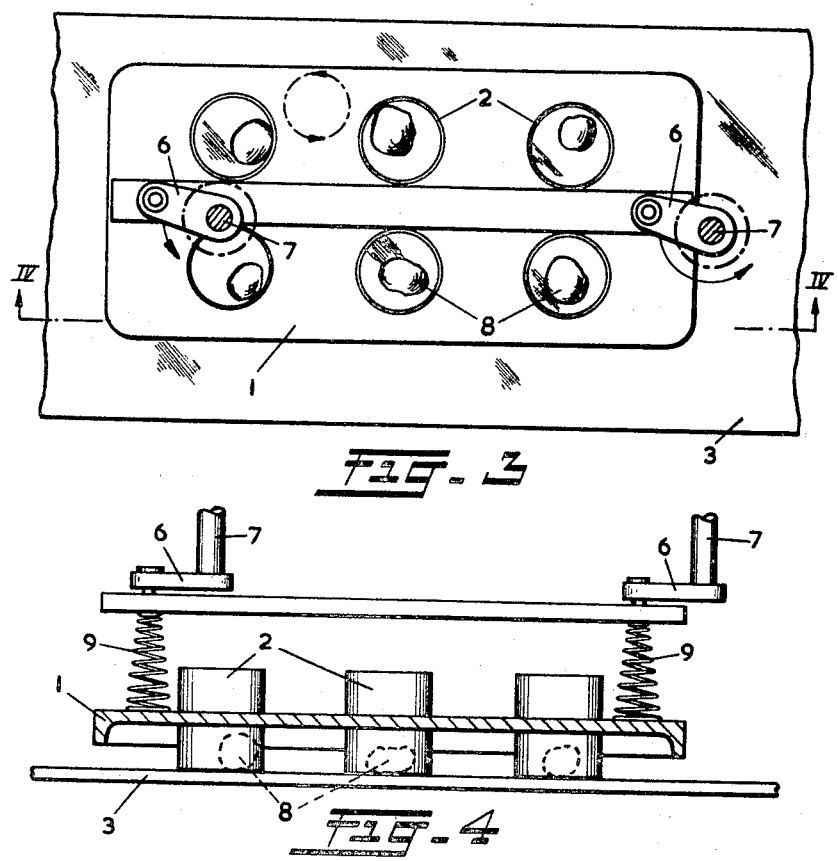

3,405,663
ROUNDING MACHINE
Pieter Johannes Benier, Voorburg, Netherlands, assignor to N.V. Nederlandsche Fabriek van Bakkerijwerktuigen v/h G.J. Benier, The Hague, Netherlands, a corporation of Netherlands
Filed Aug. 22, 1966, Ser. No. 574,034
Claims priority, application Netherlands, Sept. 2, 1965, 6511480
7 Claims. (Cl. 107—9)

ABSTRACT OF THE DISCLOSURE

A dough molding machine having a molding surface with a plurality of molding cylinders at right angles to such surface. The molding cylinders and the molding surface are moved relative to one another in a circular path. The crank drive mechanism for moving such elements relative to one another is automatically set dependent upon the forces exerted by the dough to be molded during the molding operation.

---

The present invention relates to a machine for rounding pieces of dough, which comprises a plurality of rounding cylinders extending at right angles to a rounding surface, said rounding cylinders and said rounding surface being driven relative to each other according to a circular or substantially circular path.

In rounding machines of this type, which are known in several constructional embodiments, the or each moving part passes through a fixed path prescribed by the construction of the drive means.

It is a disadvantage of the known rounding machines that, when in operation, they ignore the nature and composition of the dough pieces to be rounded. As a consequence, it is often impossible to gain a satisfactory result and produce dough balls with a smooth and tense skin, particularly in rounding soft and sticky dough species. Besides, there is a risk that the rounding surface, which sometimes also serves as a bearing surface for the dough pieces, is smeared with dough jammed between an edge of the rounding cylinders and the rounding surface so as to cause interruptions of work in rounding.

It is an object of this invention to provide an improved construction of a rounding machine of the subject type, whereby the above-mentioned drawbacks are avoided.

To this effect, according to the invention, the rounding machine is characterized in that the rounding cylinders and/or the rounding surface are or is connected by a lost motion coupling to the associated drive means, so that the path of travel of the or each driven part is not only dependent on the operation of the drive means but also on the nature and the behaviour of the dough pieces to be rounded.

In illustration of this invention two embodiments of the rounding machine will now be described, by way of example, with reference to the accompanying drawings, in which:

FIG. 1 is a plan view of the essential parts of the first embodiment;

FIG. 2 is a section taken along the line II—II in FIG. 1;

FIG. 3 is a plan view of the essential parts of the second embodiment;

FIG. 4 is a section taken along the line IV—IV in FIG. 3.

Referring now to FIGURES 1 and 2, the rounding machine comprises a holder plate 1 having a plurality of rounding cylinders 2 mounted therein at right angles to the holder plate. The assembly of rounding cylinders is movable within the plane of the holder plate 1 over a rounding surface 3, which seals the bottom ends of the rounding cylinders 2 and also serves as a bearing surface.

Mounted on the holder plate 1 are two upwardly extending pins 4, the tops of which project into a longitudinal slot 5 of an associated crank arm 6 mounted at right angles to a drive shaft 7.

When the rounding machine is in operation and a dough piece 8 is put into each of the rounding cylinders 2, with the respective dough pieces bearing on the rounding surface 3, the drive shafts 7 will cause the assembly of rounding cylinders 2 to move in a circular path, the radius of that circular movement being partly defined by the dough pieces 8 to be rounded, and thus being dependent on the nature of the dough treated and the friction occurring between the dough pieces on the one hand, and the surface 3 and the preferably felted inner wall of the rounding cylinders 2 on the other. As a consequence, the pieces of dough will never be forced during the rounding treatment, which is a prime condition for obtaining dough balls with a smooth and tense skin.

In the constructional embodiment shown in FIGURES 3 and 4, the lost motion of the assembly of rounding cylinders 2, that is the possibility of adjusting the maximum dimension of the radius of the circular movement of the assembly of rounding cylinders partly by the dough pieces 8, is realized by helical springs 9 extending normal to the holder plate 1 and the crank arms 6, and interconnecting said holder plate and said crank arms.

Naturally, this invention is not limited to the two embodiments described above. Many other constructional embodiments can be throught of for a lost motion connection between the drive means on the one hand and the rounding cylinders and/or the rounding surface on the other in order to have, in accordance with the principle underlying the present invention, the path of travel of the rounding cylinders and/or the rounding surface defined partly by the nature and the behavior of the dough pieces to be rounded.

I claim:

1. A rounding machine comprising a rounding surface, a plurality of rounding cylinders extending at right angles to said surface, means for driving said rounding cylinders and said rounding surface relative to each other in a substantially circular path, a lost motion coupling connecting said rounding cylinders to said driving means whereby the path of travel of said driven elements is not only dependent on the operation of said driving means but also on the nature and behavior of the dough pieces to be rounded.

2. A machine as set forth in claim 1 wherein a holder plate extending parallel to said rounding surface is provided in which said cylinders are mounted.

3. A machine as set forth in claim 2, wherein said driving means comprises a rotating shaft and a crank arm having a slot, and said holder plate has a pin extending into said slot.

4. A machine as set forth in claim 1 wherein said driving means is connected to said rounding cylinders via a spiral spring.

5. A dough molding machine comprising a molding surface, a plurality of molding cylinders extending at right angles to said molding surface, a crank drive mechanism wherein the radius of the crank-pin movement is capable of being set for moving said molding cylinders and said molding surface relative to each other according to a substantially circular path, said crank drive mechanism having means through which the radius of the circular path of the molding element driven by the crank drive mechanism is automatically set in dependence on the forces exerted by the dough to be molded on the driven molding element during the molding operation.

6. A dough molding machine according to claim 5 wherein said crank drive mechanism comprises a crank arm with a radial slot and a movable crank pin mounted on the driven molding element extending into said slot.

7. A dough molding machine according to claim 5 wherein said crank drive mechanism comprises a crank arm connected to the driven molding element via a spring.

References Cited

UNITED STATES PATENTS

| | | |
|---|---|---|
| 614,797 | 11/1898 | Dobson. |
| 776,731 | 12/1904 | Dietz. |
| 1,948,870 | 2/1934 | Pointon et al. |
| 2,273,219 | 2/1942 | Rhodes. |

WALTER A. SCHEEL, *Primary Examiner.*

ARTHUR O. HENDERSON, *Assistant Examiner.*